United States Patent Office 3,219,650
Patented Nov. 23, 1965

3,219,650
PROCESS FOR THE POLYMERIZATION
OF DIOLEFINS
Robert W. Hill, Leawood, Kans., assignor, by mesne assignments, to Gulf Oil Corporation, Pittsburgh, Pa., a corporation of Pennsylvania
No Drawing. Filed Apr. 25, 1960, Ser. No. 24,220
20 Claims. (Cl. 260—94.3)

This application is a continuation-in-part of Serial No. 796,220, filed March 2, 1959, and now abandoned; Serial No. 800,953, filed March 23, 1959, and now abandoned; and Serial No. 858,590, filed December 10, 1959, and now abandoned.

This invention relates to synthetic polymers. More particularly, this invention is concerned with processes for the polymerization of diolefins and novel catalyst compositions useful therein.

Ziegler-type catalysts comprising an organoaluminum compound such as a trialkylaluminum or a dialkylaluminum hydride, and a halide of a metal from Groups IVB, VB or VIB of the Periodic Table shown in Deming's "General Chemistry," (5th Ed.), John Wiley and Sons, which is reprinted in the "Handbook of Chemistry and Physics," 31st Ed. (1949), Chemical Rubber Publishing Co., p. 336, have been used to polymerize diolefins. The results obtained, however, have left considerable to be desired. Clearly, processes using these catalysts which give the desired polydiolefins with improved results would be useful commercially.

According to the present invention it has been discovered that by effecting the polymerization of diolefins with a Ziegler catalyst comprising an organoaluminum compound such as a trialkylaluminum or dialkylaluminum hydride, with a metal halide in the presence of a suitable additive, important polymerization advantages and results can be obtained.

The additives with which this invention is concerned can be described meaningfully as the polyamines, polyethers and aminoethers. By "polyamine" is meant a compound containing at least two nitrogen atoms present as substituted or unsubstituted amine groups. By "polyether" is meant a compound containing two oxygens bonded as ethers, and advisably such compounds in which one of the ether groups is acyclic. By "aminoether" is meant a compound having both an amino nitrogen atom and an ether oxygen atom in the molecule.

The use of such additives in the polymerization of diolefins generally increases the yield of the product, alters the stereochemical course of the polymerization to give sterically pure polymers in many cases, affects the molecular weight of the polymer and the polymerization rate. The most active catalysts formed according to this invention are those in which the aminoether, polyether or polyamine normally forms chelates with metals.

Some specific additives which can be used in the process are 1,2-dimethoxyethane, 1,1-dimethoxyethane, diethylene glycol dimethyl ether, N,N,N',N'-tetramethylethylenediamine, N-methylmorpholine, 1,3-dimethoxypropanol-2, N,N,N',N' - tetramethylmethylenediamine, N,N',N" - trimethyl diethylenetriamine, N,N'-diethylethylenediamine, 1,3-bis(dimethylamino)propanol-2, diethylaminomethyl methyl ether, N,N,N',N'-tetramethyl-1,3-propanediamine, 2-ethoxyethylamine and 1-bis(2-ethoxyethyl)amine.

Some of the organoaluminum compounds which can be used are the trialkylaluminum and dialkylaluminum hydrides and particularly those in which the alkyl moiety is a lower alkyl, such as up to eight carbons but particularly of one to four carbons, including compounds trimethylaluminum, triethylaluminum, tripropylaluminum, triisobutylaluminum, diethylaluminum hydride and dimethylaluminum hydride.

Representative of the metal halides useful in preparing the catalyst are the chlorides and bromides of titanium, vanadium and chromium such as vanadium trichloride, vanadium tetrachloride, chromium trichloride, titanium tetrabromide, titanium trichloride and titanium tetrachloride, the oxyhalides of such metals including vanadium oxychloride, and complexes such as $AlCl_3 \cdot 2TiCl_3$.

The catalysts useful in the process of this invention are conveniently formed by combining at least one of the additives with the alkylaluminum-metal halide Ziegler-type catalyst in an inert solvent, or by combining the additive with the metal halide before the organometallic component is added to form the catalyst. Thus, by way of illustration, the additive can be added to titanium or vanadium trichloride prior to the addition of the alkylaluminum compound, or the catalyst components and additive can be added to an inert solvent present with the diolefin to be polymerized. Furthermore, two or more additives can be used if desired.

The Ziegler-type catalyst (without additive) is conveniently produced by combining the organoaluminum compound with the metallic halide in the presence of a hydrocarbon solvent such as isooctane, n-heptane or benzene. The molar ratio between the alkylaluminum compound and the halogenated metal can be varied within wide limits. A ratio of about 0.25 to about 4 moles of halogenated compounds, such as a titanium or vanadium trichloride, to 1 mole of the alkylaluminum compound is suitable. A typical catalyst system could be composd of triisobutylaluminum and titanium trichloride combined in an equimolar ratio.

Heating of the Ziegler-type catalyst and additive when combined in an inert solvent at a moderately elevated temperature improves the reactivity of the catalyst. By heating is normally meant temperatures of about 60–65° C. although with some additives higher temperatures up to 100° C. could be used. When such a heating operation is combined with the use of an additive which forms chelates with metals the most active catalyst is usually obtained. Apparently a complexing results upon heating because a color change is generally obtained and a precipitate often results.

Lower diolefins such as isoprene, butadiene, chloroprene, methoxy butadiene and piperylene can be polymerized in increased yields by this process.

In general, up to about 0.5 mole of additive per mole of organoaluminum compounds is effective in increasing the polymerization rate of the diolefin. However, about 0.01 to about 0.3 mole of additive for each mole of organoaluminum compound is advisably used.

The polymerization of a diolefin employing the described Ziegler-type catalyst in combination with at least one of the additives of this invention is readily effected using an inert solvent such as benzene and saturated hydrocarbons like isooctane, n-hexane, pentane, decane or cyclohexane. The polymerization reaction is effected at a temperature from about 0° C. to 105° C. with the process advisably being effected at 25° C. to 85° C. Polymerization is advisably effected at about atmospheric pressure or slightly higher. A particularly suitable pressure is 30 p.s.i.g. although higher pressures can be used, but are not needed.

The process is conveniently effected batch-wise by first combining the organoaluminum and metallic halide in an inert solvent, and advisably in an inert atmosphere and adding the additive to the catalyst slurry. After the catalyst is prepared the diolefin is added to the mixture. The reactor is heated slightly under autogenous pressure. At completion of the polymerization reaction, the polymer slurry is filtered to isolate the resinous polydiolefin. Some polymers remain in solution in the filtrate. The solid product so obtained is then freed of catalyst residues by any of several known techniques. One method is to stir a slurry of the polydiolefin in water or an alcohol such as methanol and then remove the insoluble resinous polydiolefin by filtration to give a friable white product. The polydiolefins soluble in the reaction solvent can be isolated by adding an excess of methanol and filtering off the precipitated polymer.

Of course, the polymerization can be adapted readily to a continuous process under the proper conditions.

Heating of the trialkylaluminum component of a Ziegler-catalyst prior to use in the polymerization leads to an increased polymerization rate. The trialkylaluminum component can be heated in an organic solvent such as n-decane at temperatures from 125° to 170° C. for from about 1 to 4 hours to promote reactivity of the subsequently formed catalyst. It would appear that such heating converts at least part of the organometallic component, such as triisobutylaluminum, into a hydride, as for example diisobutylaluminum hydride. Such hydrides, however, are recognized as Ziegler-type catalysts and accordingly can be used in the process directly without being formed in situ by the described heating process.

The following examples are presented to illustrate the invention. In these examples the additives will usually be identified by key numbers as follows to eliminate repetition of the unwieldly chemical names.

Additive
key number:     Additive
  1 _____ 1,2-dimethoxyethane.
  3 _____ 1,1-dimethoxyethane.
  4 _____ Diethylene glycol dimethyl ether.
 10 ____ N,N,N',N'-tetramethylethylenediamine.
 19 ____ N-methylmorpholine.
 24 ____ 1,3-dimethoxypropanol-2.
 26 ____ N,N,N',N'-tetramethylmethylenediamine.
 39 ____ N,N',N''-trimethyldiethylenetriamine.
 40 ____ N,N'-diethylethylenediamine.
 57 ____ 1,3-bis(dimethylamino)propanol-2.
 63 ____ Diethylaminomethyl methyl ether.
 64 ____ N,N,N',N'-tetramethyl-1,3-propanediamine.
 92 ____ 2-ethoxyethylamine.
 93 ____ Bis(2-ethoxyethyl)amine.

*Example 1*

A series of 1,3-butadiene polymerizations was carried out in the presence of various additives using 200 ml. of isooctane, 5 ml. of a 10% slurry of vanadium trichloride in isooctane, 10 ml. of a 25% solution of triisobutylaluminum in isooctane and 10 ml. of a 0.1 molar solution of the additive in isooctane, corresponding to a 0.11 molar ratio of additive to aluminum compound, charged into a 12 oz. bottle capable of withstanding 300 p.s.i. internal pressure. Butadiene (25 ml.) was then introduced and the bottle agitated overnight (16 hours) in a water bath maintained at 75° C. At the end of this period, the bottle was cooled and the contents filtered through a cloth filter with suction. The solid, insoluble product obtained by filtration was stirred with several portions of methanol in a Waring Blendor until the solid and supernatant liquids were colorless. The solid was then dried. Table 1 sets out the results obtained with various additives and control tests in which no additive was used.

TABLE 1

| Additive Key Number | Structure of Polymer | Weight in Grams of Insoluble Product |
|---|---|---|
| None | Mostly trans-1,4; much admixture with 1,2. | 8.4 |
| 26 | Mostly trans-1,4; some 1,2 | 9.5, 9.6 |
| 39 | Trans-1,4; very little 1,2 | 13.9, 14.0 |
| 40 | Mostly trans-1,4; some 1,2 | 15.0, 14.9 |
| 63 | _____do_____ | 15.0, 14.7 |
| 92 | _____do_____ | 14.7, 14.7 |

*Example 2*

The procedure of Example 1 was followed but 0.5 g. of chromium trichloride was used instead of the vanadium trichloride slurry. Filtration of the contents of the bottle separated the catalyst residue. An excess of methanol was added to the filtrate, precipitating the soluble polymer, which was isolated by filtration. The results in Table 2 show the additives used and the yields obtained. All products were soluble in isooctane and appeared by infrared to be syndiotactic 1,2-polymers.

TABLE 2

Additive key number:     Yield in grams
 None _____ 6.8
  1 _____ 12.6
 10 _____ 10.0, 11.1
 24 _____ 12.6, 12.4
 39 _____ 13.5, 11.9
 40 _____ 11.6, 11.9
 57 _____ 13.5, 12.9
 63 _____ 13.9, 14.9
 92 _____ 13.1, 13.3

*Example 3*

The procedure of Example 1 was followed but 1.5 ml. of vanadium tetrachloride was used in place of the vanadium trichloride slurry. The results in Table 3 show additives used and the yields obtained.

TABLE 3

Additive     Weight in grams of polymer
key number:     insoluble in isooctane
 None _____ 9.7
 24 _____ 11.0, 11.9
 39 _____ 10.8, 11.4
 57 _____ 11.1, 10.3
 63 _____ 11.8, 10.1

The polymers were mostly trans-1,4; with some cis-1,4 and cis-1,2.

*Example 4*

The procedure of Example 1 was followed but 5 ml. of a 10% slurry of titanium trichloride was used in place of vanadium trichloride. The soluble polymer was isolated as in Example 2. The results in Table 4 show additives used and the yields obtained.

TABLE 4

| Additive Key Number | Structure of Soluble Polymer | Weight in Grams of Polymer Soluble in Isooctane | Weight in Grams of Polymer Insoluble in Isooctane |
|---|---|---|---|
| None | Mostly trans-1,4; some cis 1,2. | 0.7 | 0.3 |
| | ____do____ | 0.6 | 0.2 |
| | ____do____ | 0.4 | 0.3 |
| | ____do____ | 0.3 | 0.3 |
| 10 | Mostly syndiotactic 1,2-; some trans 1,4. | 10.0, 10.4 | 0.3, 0.3 |
| 57 | Mostly syndiotactic 1,2-; small amount trans-1,4. | 7.8, 7.8 | 0.2, 0.2 |

*Example 5*

A series of isoprene polymerizations were carried out in the presence of various additives using 200 ml. of isooctane, 5 ml. of a 10% slurry of vanadium trichloride in isooctane, 10 ml. of a 25% solution of triisobutylaluminum in isooctane and 10 ml. of a 0.1 molar solution of the additive in isooctane, corresponding to a 0.11 molar ratio of additive to aluminum compound, charged into a 12 oz. bottle capable of withstanding 300 p.s.i. internal pressure. Isoprene (25 ml.; 17 g.) was then introduced and the bottle agitated overnight (16 hours) in a water bath maintained at 75° C. The procedure of Example 1 was then followed. The soluble polymer was isolated as described in Example 2. Table 5 sets out the results obtained.

TABLE 5

| Additive Key Number | Structure of Polymer | Yield in Grams |
|---|---|---|
| None | A, B | 1.1 |
| 10 | A, B | 1.9 |
| 24 | A, B | 1.8 |
| 26 | A, B | 2.8 |
| 39 | A | 4.9 |
| 40 | A | 11.3 |
| 57 | A, B | 2.7 |
| 63 | A | 11.5 |
| 92 | A | 14.7 |

A—Predominantly trans-1,4-polyisoprene insoluble in isooctane.
B—Accompanied by appreciable amount of soluble polyisoprene of similar structure.

*Example 6*

Isoprene polymerizations were carried out as in Example 5 using 0.5 g. of chromium trichloride in n-heptane in place of the vanadium trichloride slurry. The results are shown in Table 6. The product, which was predominantly 3,4-polyisoprene soluble in n-heptane, was isolated as in Example 2.

TABLE 6

| Additive key number: | Yield in grams |
|---|---|
| None | 0.8 |
| 10 | 1.5 |
| 57 | 2.5 |
| 92 | 3.0 |

*Example 7*

Isoprene polymerizations were carried out as in Example 5 with various additives using 1.4 ml. of vanadium oxychloride in place of the slurry of vanadium trichloride and n-heptane was used as the solvent. The results are shown in Table 7. The polyisoprene was highly cross-linked, predominantly trans-1,4 and insoluble in n-heptane. In addition, an appreciable amount of n-heptane-soluble polymer of similar structure was produced.

TABLE 7

| Additive key number: | Insoluble polymer yield in grams |
|---|---|
| None | 9.6 |
| 10 | 10.9 |
| 39 | 11.0 |
| 40 | 10.0 |
| 57 | 11.5 |
| 63 | 10.5 |
| 92 | 10.5 |

*Example 8*

Isoprene polymerizations were carried out as in Example 5 with various additives using 1.5 ml. of titanium tetrachloride in place of 5 ml. of a 10% slurry of vanadium trichloride. The polymer, which was soluble in isooctane, was isolated as in Example 2. The results are shown in Table 8.

TABLE 8

| Additive key number: | Yield in grams |
|---|---|
| None | 16 |
| 3 | 17.1 |
| 19 | 17.4 |

*Example 9*

Isoprene polymerizations were carried out as in Example 5 with various additives using 1.5 ml. of vanadium tetrachloride in place of a 10% slurry of vanadium trichloride and n-heptane was used as the solvent. The results are shown in Table 9. The polyisoprene was highly cross-linked, predominantly trans-1,4 and insoluble in n-heptane. However, an appreciable amount of n-heptane-soluble polymer of similar structure was produced.

TABLE 9

| Additive key number: | Insoluble polymer yield in grams |
|---|---|
| None | 8.0 |
| 1 | 8.3 |
| 92 | 8.4 |

*Example 10*

Isoprene polymerizations were carried out as in Example 5 with various additives using 15 ml. of a 10% solution of titanium tetrabromide in place of vanadium trichloride and using n-heptane as the solvent. The results are shown in Table 10. The polyisoprene was predominantly cis-1,4, rubbery and a somewhat tacky solid.

TABLE 10

| Additive key number: | Yield in grams |
|---|---|
| None | 16.6 |
| 64 | 16.9 |
| 88 | 19.8 |

*Example 11*

Isoprene polymerizations were carried out as in Example 5 with titanium trichloride used in place of vanadium trichloride and n-heptane as the solvent. The results are shown in Table 11. The product formed with N,N,N′,N′-tetramethyl ethylenediamine as the additive (No. 10) and 1,2-dimethoxyethane (No. 1) was entirely or predominantly 1,2-polymer soluble in n-heptane. The products of the other runs were not characterized.

TABLE 11

| Additive key number: | Yield in grams |
|---|---|
| None | 0.5 |
| 1 | 0.8 |
| 10 | 2.9 |
| 24 | 0.7 |
| 40 | 0.6 |
| 63 | 0.6 |

The experiment was repeated with additive 10 using the same reactants as indicated, and titanium trichloride (0.5 g.) to which 0.03 g. of titanium tetrachloride was added. The results are shown in Table 11A.

TABLE 11A

| | Yield in grams |
|---|---|
| No TiCl₄ added | 2.6 |
| 0.03 g. TiCl₄ added | 4.5, 6.3 |

The polyisoprene was pure 3,4-polymer.

*Example 12*

Isoprene polymerizations were carried out as in Example 5 with 5 ml. of a 10% slurry of the crystalline complex AlCl₃·2TiCl₃ used in place of vanadium trichloride and n-heptane as the solvent. The results are shown in Table 12. The polyisoprene, a semi-solid 3,4-polymer grease of high steric purity, soluble in n-heptane, was isolated as in Example 2.

TABLE 12

| Additive key number: | Yield in grams |
|---|---|
| None | 2.6 |
| 1 | 5.4 |
| 3 | 7.7 |
| 4 | 4.6 |
| 10 | 4.6 |
| 19 | 2.9 |
| 63 | 3.6 |
| 64 | 2.8 |
| 92 | 3.4 |
| 93 | 3.5 |

Various changes and modifications of the invention can be made and, to the extent that such variations incorporate the spirit of this invention they are intended to be included within the scope of the appended claims.

What is claimed is:

1. The process of polymerizing a diolefin which comprises contacting the diolefin with a catalyst composition comprising an organoaluminum compound combined with a halide of a metal from a member of the group consisting of Groups IVB, VB, and VIB of the Periodic Table, and an additive compound which normally forms chelates with metals, said additive compound being selected from the group consisting of polyethers having at least one acyclic ether group, polyamines and aminoethers.

2. The process of polymerizing a lower diolefin which comprises contacting the diolefin with a catalyst composition comprising a trialkyl aluminum combined with a halide of a metal from the group consisting of Groups IVB, VB, and VIB of the Periodic Table, and an additive compound which normally forms chelates with metals, said additive compound being selected from the group consisting of polyethers having at least one acyclic ether group, polyamines and aminoethers, said additive compound being employed in the ration of about 0.01 to 0.5 mol per mol of trialkyl aluminum.

3. The process of polymerizing a lower diolefin which comprises contacting the diolefin with a catalyst composition comprising a dialkyl aluminum hydride combined with a halide of a metal from a member of the group consisting of Groups IVB, VB and VIB of the Periodic Table, and an additive compound which normally forms chelates with metals, said additive compound being selected from the group consisting of polyethers having at least one acyclic ether group, polyamines and aminoethers, said additive compound being employed in the ratio of about 0.01 to 0.5 mol per mol of dialkyl aluminum hydride.

4. The process of claim 1 in which about 0.01 to 0.5 mole of additive per mole of organoaluminum compound is used.

5. The process of claim 1 in which the diolefin is isoprene.

6. The process of claim 1 in which the diolefin is butadiene.

7. The process of polymerizing butadiene which comprises bringing butadiene into contact with a polymerization catalyst composition comprising vanadium trichloride, combined with triisobutylaluminum and about 0.01 to 0.5 mole of N,N',N''-trimethyldiethylenetriamine per mole of triisobutylaluminum.

8. The process of polymerizing butadiene which comprises bringing butadiene into contact with a polymerization catalyst composition comprising vanadium trichloride, combined with triisobutylaluminum and about 0.01 to 0.5 mole of N,N'-diethylethylenediamine per mole of triisobutylaluminum.

9. The process of polymerizing butadiene which comprises bringing butadiene into contact with a polymerization catalyst composition comprising vanadium trichloride, combined with triisobutylaluminum and about 0.01 to 0.5 mole of diethylaminomethyl methyl either per mole of triisobutylaluminum.

10. The process of polymerizing butadiene which comprises bringing butadiene into contact with a polymerization catalyst composition comprising vanadium trichloride, combined with triisobutylaluminum and about 0.01 to 0.5 mole of 2-ethoxyethylamine per mole of triisobutylaluminum.

11. The process of polymerizing butadiene which comprises bringing butadiene into contact with a polymerization catalyst composition comprising chromium trichloride, combined with triisobutylaluminum and about 0.01 to 0.5 mole of 1,2-dimethoxyethane per mole of triisobutylaluminum.

12. The process of polymerizing butadiene which comprises bringing butadiene into contact with a polymerization catalyst composition comprising chromium trichloride, combined with triisobutylaluminum and about 0.01 to 0.5 mole of 1,3-dimethoxypropanol-2 per mole of triisobutylaluminum.

13. The process of polymerizing butadiene which comprises bringing butadiene into contact with a polymerization catalyst composition comprising chromium trichloride, combined with triisobutylaluminum and about 0.01 to 0.5 mole of N,N',N''-trimethyldiethylenetriamine per mole of triisobutylaluminum.

14. The process of polymerizing butadiene which comprises bringing butadiene into contact with a polymerization catalyst composition comprising chromium trichloride, combined with triisobutylaluminum and about 0.01 to 0.5 mole of diethylaminomethyl methyl ether per mole of triisobutylaluminum.

15. The process of polymerizing butadiene which comprises bringing butadiene into contact with a polymerization catalyst composition comprising chromium trichloride, combined with triisobutylaluminum and about 0.01 to 0.5 mole of 2-ethoxyethylamine per mole of triisobutylaluminum.

16. The process of polymerizing butadiene which comprises bringing butadiene into contact with a polymerization catalyst composition comprising titanium trichloride, combined with triisobutylaluminum and about 0.01 to 0.5 mole of N,N,N',N'- tetramethylethylenediamine per mole of triisobutylaluminum.

17. The process of polymerizing isoprene which comprises bringing isoprene into contact with a polymerization catalyst composition comprising vanadium trichloride, combined with triisobutylaluminum and about 0.01 to 0.5 mole of N,N'-diethylethylenediamine per mole of triisobutylaluminum.

18. The process of polymerizing isoprene which comprises bringing isoprene into contact with a polymerization catalyst composition comprising vanadium trichloride, combined with triisobutylaluminum and about 0.01 to 0.5 mole of diethylaminomethyl methyl ether per mole of triisobutylaluminum.

19. The process of polymerizing isoprene which comprises bringing isoprene into contact with a polymerization catalyst composition comprising vanadium trichloride, combined with triisobutylaluminum and about 0.01 to 0.5 mole of 2-ethoxyethylamine per mole of triisobutylaluminum.

20. The process of polymerizing isoprene which comprises bringing isoprene into contact with a polymerization catalyst composition comprising chromium trichloride, combined with triisobutylaluminum and about 0.01 to 0.5 mole of 2-ethoxyethylamine per mole of triisobutylaluminum.

References Cited by the Examiner

UNITED STATES PATENTS

| | | | |
|---|---|---|---|
| 2,886,561 | 5/1959 | Reynolds et al. | 260—94.9 |
| 2,905,645 | 9/1959 | Anderson et al. | 260—94.9 |
| 2,932,633 | 4/1960 | Juveland et al. | 260—94.9 |

FOREIGN PATENTS

| | | |
|---|---|---|
| 554,242 | 5/1957 | Belgium. |
| 564,772 | 8/1958 | Belgium. |
| 809,717 | 4/1959 | Great Britain. |
| 820,773 | 9/1959 | Great Britain. |

JOSEPH L. SCHOFER, *Primary Examiner.*

LESLIE H. GASTON, MORRIS LIEBMAN, WILLIAM H. SHORT, *Examiners.*